(12) United States Patent
Ivanov (10) Patent No.: US 10,725,856 B2
(45) Date of Patent: Jul. 28, 2020

(54) ERROR CORRECTION TO REDUCE A FAILURE IN TIME RATE

(71) Applicant: Micron Technology, Inc., Boise, ID (US)

(72) Inventor: Ivan Ivanov, Steinhoering (DE)

(73) Assignee: Micron Technology, Inc., Boise, ID (US)

( * ) Notice: Subject to any disclaimer, the term of this patent is extended or adjusted under 35 U.S.C. 154(b) by 597 days.

(21) Appl. No.: 15/401,420

(22) Filed: Jan. 9, 2017

(65) Prior Publication Data

US 2018/0196614 A1   Jul. 12, 2018

(51) Int. Cl.
*G06F 3/06* (2006.01)
*G06F 3/00* (2006.01)
*G06F 11/10* (2006.01)
*G06F 11/00* (2006.01)
*H03M 13/00* (2006.01)

(52) U.S. Cl.
CPC ...... *G06F 11/1008* (2013.01); *G06F 11/1048* (2013.01)

(58) Field of Classification Search
None
See application file for complete search history.

(56) References Cited

U.S. PATENT DOCUMENTS

| | | | |
|---|---|---|---|
| 6,067,460 A | 5/2000 | Alanara et al. | |
| 6,214,990 B1 | 4/2001 | Tanaka et al. | |
| 7,573,773 B2 * | 8/2009 | Lin | G11C 16/3418 365/185.01 |
| 7,607,053 B2 | 10/2009 | Moelker | |
| 9,373,416 B2 * | 6/2016 | Wang | G11C 29/10 |
| 9,727,413 B2 * | 8/2017 | Cordero | G06F 11/106 |
| 2003/0135794 A1 * | 7/2003 | Longwell | G06F 11/073 714/42 |
| 2012/0036411 A1 * | 2/2012 | Ito | G06F 11/106 714/754 |
| 2014/0006859 A1 * | 1/2014 | Ryu | G06F 11/106 714/21 |
| 2014/0229766 A1 * | 8/2014 | Campbell | G06F 11/106 714/15 |
| 2015/0006998 A1 * | 1/2015 | Cordero | G06F 11/106 714/773 |
| 2017/0161143 A1 * | 6/2017 | Reed | G11C 7/02 |

OTHER PUBLICATIONS

"Measurement and Reporting of Alpha Particle and Terrestrial Cosmic Ray-Induced Soft Errors in Semiconductor Devices" JEDEC Solid State Technology Association, Arlington, VA, Oct. 2006, 92 pp.

* cited by examiner

*Primary Examiner* — Justin R Knapp
(74) *Attorney, Agent, or Firm* — Brooks, Cameron & Huebsch, PLLC (57) ABSTRACT

An example apparatus for error correction can include an array of memory cells and a controller. The controller can be configured to perform a dummy read on a portion of data stored in the array. The dummy read can include sending a portion of data on output buffers to a host. The controller can be configured to error correct the portion of data in the host. The controller can be configured to write the portion of data back to the array.

30 Claims, 4 Drawing Sheets

Fig. 5

ERROR CORRECTION TO REDUCE A FAILURE IN TIME RATE

TECHNICAL FIELD

The present disclosure relates generally to semiconductor memory and methods, and more particularly, to apparatuses and methods related to error correcting.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others.

Increased memory density, such as in DRAM memories, has resulted in intermittent failures caused by repeated access to a particular row of memory cells (e.g., cells coupled to an access line). These intermittent failures due to increased density referenced above can be due to a bit error rate (BER) that affects reading of data associated with the DRAM memory. A bit error refers to a number of received bits of data over a communication channel that has been altered due to noise, interference, distortion, and/or bit synchronization errors. A bit error rate (BER) refers to a number of bit errors per unit of time. An error correction code (ECC) component can be used to detect and/or correct errors in data but at a cost of reduced latency, increased ECC overhead, etc. An ability to correct errors in such a system can be beneficial in certain instances like autonomous driving systems. However, it is also beneficial to maintain a particular speed of the system while maintaining a lower ECC overhead. Therefore, an ability to reduce errors (e.g., soft errors) in stored data can be beneficial.

DETAILED DESCRIPTION

The present disclosure includes apparatuses and methods related to error correcting reads and writes can include an array of memory cells. The apparatus can include a controller coupled to the array. The controller can be configured to perform a dummy read on a portion of data stored in the array. A dummy read, as used herein, refers to a read performed without using the obtained data from the read to perform an operation and/or without using the obtained data as input data to an operation. For example, a read is performed without further use of the data in performing an operation prior to writing the data back to the array. In some examples, the data from the dummy read is error corrected prior to writing back to the array. To clarify, the data from the read is used when error correcting but the data is not used to provide instructions to perform an additional operation, nor is the data used as input data to an operation to determine an output (e.g., a mathematical result, an operational result, an address indication, etc.), nor is the data used in an execution operation where the data is used to execute the operation. The controller can be configured to error correct the portion of data. The controller can be configured to write the portion of data back to the array.

A data restore operation can refer to performing: a dummy read that reads the data out of the memory array to a host, error correction on the read data performed by the host, and writing the corrected data back to the memory array. The data restore operation can be performed to maintain a DRAM system failure in time (FIT) rate under a particular threshold. By maintaining a FIT rate under the particular threshold, the data can remain correctable. A frequency of the data restore operations can be based on a number of factors. For example, the frequency that data restore operations are performed can be based on a temperature of the DRAM, an altitude, a number of errors detected in the DRAM, etc. An error log of the DRAM can be checked to determine the number of errors. The frequency that the data restore operation is performed can be based on the error log.

As memory density has increased, intermittent failure has appeared in some devices, such as DRAM memories, which may experience failures due to repeated access to a particular row of memory cells (e.g., cells coupled to an access line) within a refresh window associated with the cells. A DRAM device can include at least one of a DDR (double data rate) interface and a LPDDR (low power DDR) interface. These intermittent failures caused by BERs that affect reading of the data can be reduced by reading and writing the data additional times beyond the memory refreshes. By doing so, the data can be read to the host, error corrected, and rewritten back to the memory array. The error correction of the host can reduce the BER rates and increase reliability of the data. An increase in data reliability can reduce the number of ECC bits used to insure lower BER rates. By decreasing the number of ECC bits used, reduced latency and overhead cost can be minimized. A speed of a memory system, such as one used in autonomous driving systems, can be maintained by reducing soft errors while lowering ECC overhead.

A memory refresh refers to a process of periodically reading data stored in a memory and immediately rewriting the data back to the memory without modification, for the purpose of preserving the data. In a Dynamic Random Access Memory (DRAM) chip, each bit of memory is stored as an electric charge on a small capacitor on the chip. As time passes, these charges stored in the memory cells can leak if not refreshed at particular time intervals. The data could be eventually lost absent a memory refresh. During the memory refresh, circuitry can periodically cause reading of each memory cell and rewriting of the data of the memory cell back to the memory cell, restoring the charge on the capacitor of the memory cell back to its original level. The memory refresh can be performed automatically, in the background, while the DRAM is in an ON mode.

A memory refresh does not use the normal memory operations (e.g., read and write cycles) used to access data. Instead specialized cycles referred to as refresh cycles are generated by separate counter circuits and interspersed between normal memory accesses. A refresh cycle is similar to a normal read cycle but differs in two important ways. First, a refresh uses only a row address so the column address is not necessary. Second, data read from the cells during a memory refresh is not sent through output buffers and/or on a data bus to a host. For example, data stored in a memory array can be read from the cells into a corresponding sense amplifier and then stored back into the cells, and thereby refresh the original data values to a full state. In at least one embodiment, a memory array can maintain a low latency response time while maintaining a low error rate. For example, the memory array can be in a standby mode when performing reads and/or writes and can be activated at particular time intervals to perform dummy reads to correct any errors. By activating the memory array at the particular time intervals, a failure in time (FIT) error rate can be maintained below a threshold error rate. By doing so, errors can be maintained below a level at which the memory can no longer be corrected. For example, error correction methods and/or systems can be limited to a number of correctable bits and/or portions of data that the method or system can correct. Once the memory array exceeds these limits, the memory array may become uncorrectable. By maintaining error rates below a threshold, the memory array remains correctable.

In at least one embodiment, by maintaining error rates below a threshold to insure correctability of the data, a need for a dual memory and/or a redundant memory can be reduced. For example, maintaining the data at BER and/or FIT rates that maintain a level of errors that are correctable by ECC methods (and preventing the data from becoming uncorrectable) can reduce the need to have redundant data. The redundant data would become unnecessary as the correctable data would not become so uncorrectable that the redundant data would then be accessed.

A memory refresh can correspond to a temperature of a memory array (e.g., DRAM memory). For example, a temperature sensor within and/or on the memory array itself can indicate whether to refresh the memory. Refresh intervals can be adjusted automatically based on temperatures of the memory array. In the alternative, a temperature sensor on a memory controller associated with the memory array can be used. In this way, power can be saved by correlating the refresh intervals with temperatures that are associated with a particular rate of error accumulation in the memory array rather than based on just time. In contrast to memory refreshes that are correlated with temperature and/or time, embodiments described herein can include waking up the memory array from a standby mode, described below, and reading (referred to herein as a dummy read) the data out to the host and writing the data back to the memory array. The data can remain unchanged during the reading and/or writing other than error correcting the data. For example, the data can be read out of the memory array without performing operations on the memory other than error correction.

The reading, error correcting, and writing the data can be referred to herein as a data restore operation. For example, a data restore operation performed on the data can refer to reading all data within a memory array (e.g., all rows and/or columns of the memory array), error correcting the data via a host's ECC component, and writing the read and/or error corrected data back to the memory array. The data restore can be performed on a number of banks of memory cells of the memory array. The data restore can be initiated and/or controlled by a controller on the host (external from the memory device). The data restore can be performed on a regular basis (e.g., weekly, monthly, etc.) while the memory array is in a standby mode (e.g., not performing operations and in a low energy state). For example, the memory device including the memory array can be in a standby mode and can be woken up in order to perform the data restore on the data stored in the memory array. The frequency at which the memory device is woken up and a data restore is performed can be based on a FIT rate in order to keep the FIT rate of the memory device under a particular threshold FIT rate. The frequency can be based on a number of errors of the data stored in the memory array. The number of errors can be determined by checking an error list associated with errors of the data that a host controller maintains. The error list can indicate how frequently errors accumulate. The error list can indicate how many errors are occurring at a particular frequency, etc. Therefore, a number of dummy reads and the rate of the number of dummy reads can be performed to maintain the FIT rate of the data below a particular threshold FIT rate based on the error rate factors associated with the error list.

Standby mode can refer to a low power mode for memory devices, such as a device that includes a memory array, where power and or sourcing is cut off from unnecessary subsystems and the memory array is put into a minimum power state. The standby mode is sufficient to retain the data in the memory array and to respond to a wake up command but the data within the memory array is not accessible until the memory device is taken out of standby mode. The memory device can be in the standby mode for a particular amount of time and/or for an indefinite amount of time. While the memory device is in standby mode, memory cells of the memory device can be refreshed per JEDEC specification, which can include refreshing a full DRAM every 64 ms at temperatures below 85 degrees C. However, a data restore operation can not be performed while the memory device is in standby mode as there is no active communication between the memory device and a host (e.g., external controller) during standby mode.

The particular amount of time that the memory device is in the standby mode can be adjusted based on an environmental factor. Environmental factors can include an altitude of the memory device, and an amount of solar activity. For example, a higher altitude of the memory device can increase a number of BERs and therefore the particular amount of time that the memory device is in the standby mode can be decreased to insure more frequent error correction. In addition, an increase in an amount of solar activity can correspond to the particular amount of time that the memory device is in the standby mode being decreased as solar activity can increase BERs.

In some example industries, such as autonomous cars (e.g., self-driving cars), low error rates in memory can be crucial to maintaining a highly functioning system that is devoid of errors or at least minimizes errors to avoid accidents and/or malfunctions. Autonomous driving can include functionalities such as autonomous braking, autonomous steering, etc. These autonomous systems may be manufactured to meet safety standards (e.g., Safety Standard ISO 26262). For example, the autonomous driving system can be made to work in a full temperature range of −40 degrees Celsius+105 degrees Celsius/125 degrees Celsius and a speed with a failure in time (FIT) less than 1 for as long as 15 to 17 years or longer. In order to maintain low latency response times, as described above, these requirements may be met continuously throughout this period of time (e.g., be in a standby mode for much of the life of the autonomous driving system).

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included. As used herein, "a number of" a particular thing can refer to one or more of such things (e.g., a number of memory arrays can refer to one or more memory arrays).

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
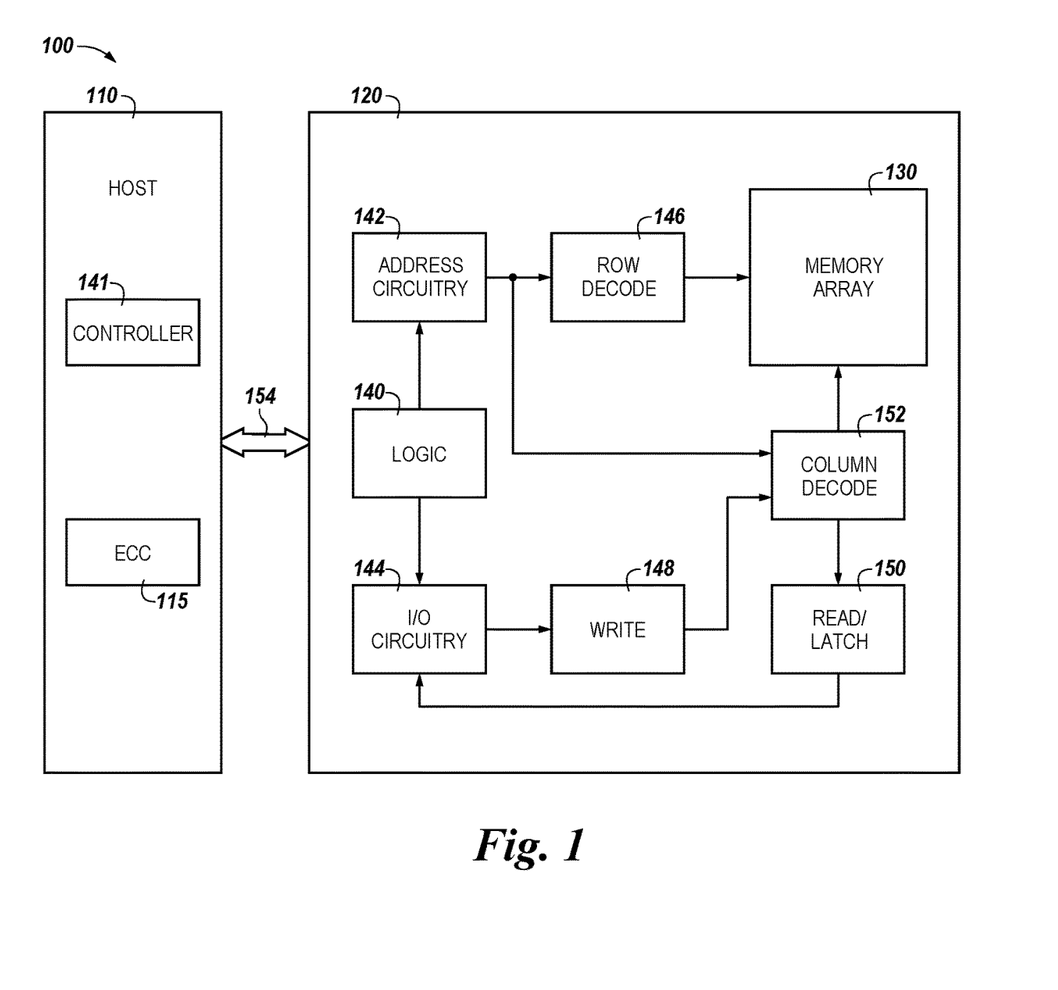
FIG. 1 is a block diagram of a system for error correction in accordance with a number of embodiments of the present disclosure.

FIG. 1 is a block diagram of an apparatus in the form of a computing system 100 including a memory device 120 in accordance with a number of embodiments of the present disclosure. As used herein, a memory device 120, a memory array 130, and/or a logic 140 (e.g., control logic), and/or read/latch circuitry 150 might also be separately considered an "apparatus."

System 100 includes a host 110 coupled (e.g., connected) to memory device 120, which includes a memory array 130. An example of memory device 120 includes a DRAM device. In a number of embodiments, the DRAM device may not include an on-die ECC capability or reduced ECC capability as compared to a host ECC (e.g., ECC on the host 110). Host 110 can be a host system such as a personal laptop computer, a desktop computer, a digital camera, a smart phone, or a memory card reader, among various other types of hosts. Host 110 can include a controller 141 that is external to the memory device 120. Host 110 can include a system motherboard and/or backplane and can include a number of processing resources (e.g., one or more processors, microprocessors, or some other type of controlling circuitry). The host 110 can include an error correction code (ECC) component 115 that includes error correction circuitry and/or components to perform a number of error corrections. An ECC engine (not illustrated) can be coupled to the memory array 130 that corrects errors as the data is read out from the memory array 130 through output buffers. However, the corrected data that has been transferred through the ECC engine would have sent to the host without changing the original data stored in the memory array 130. That is, the correction would be made to the data sent to the host and does not affect the data that may include errors while stored in the memory array 130. In this way, an error correction within the host (e.g., by the ECC 115) that is written back to the memory array 120 would be more effective in correcting errors in the data and maintaining those corrections in the data stored in the memory array 120.

The system 100 can include separate integrated circuits or both the host 110 and the memory device 120 can be on the same integrated circuit. For instance, the system 100 can be a hybrid memory cube (HMC) where control components (e.g., logic 140) can be located on a logic die and memory components can be located in a number of stacked dies.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines. Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over bus 154 (e.g., a data bus) through I/O circuitry 144. Address signals may also be sent by controller 141 and received to logic 140 (e.g., via address circuitry 142 and/or via bus 154). Address signals are received and decoded by a row decoder 146 and a column decoder 152 to access the memory array 130. Data can be read from memory array 130 by sensing voltage and/or current changes on the data lines using read/latch circuitry 150. The read/latch circuitry 150 can read and latch a page (e.g., row) of data from the memory array 130. The I/O circuitry 144 can be used for bi-directional data communication with host 110 over the bus 154. The write circuitry 148 is used to write data to the memory array 130.

Logic 140 decodes signals provided by controller 141 through bus 154 from the host 110. While bus 154 is illustrated as a single bus sending address signals, bi-directional communication, decode signals etc., embodiments are not so limited. For example, the bus 154 can be separated into more than one bus where each bus is designated for particular signals (e.g., a bus for address signals and/or commands, a bus for bi-directional communication, etc.). These signals can include chip enable signals, write enable signals, and address latch signals that are used to control operations performed on the memory array 130, including data read, data write, and data erase operations. In various embodiments, the logic 140 is responsible for executing instructions from the host 110. The logic 140 can be a state machine, a sequencer, or some other type of control circuitry. Logic 140 can be implemented in hardware, firmware, and/or software. While the logic 140 is illustrated as coupled to particular components (e.g., coupled to memory array 130 and address circuitry 142), the controller can be coupled to any of the components within memory device 120.

As described below, any number of components of the memory device 120 can be in standby mode or in active mode. For example, the memory array 130 can be in standby mode and the logic 140 can be in active mode. The memory array 130 and the logic 140 can both be in standby mode simultaneously. The memory array 130 and the controller can both be in active mode. The memory array 130 can be in active mode and the logic 140 can be in standby mode. In this way, different portions of the memory device 120 can be standing by and/or active in order to facilitate an efficient latency response time and a desired power usage for performing reads, writes, and/or additional operations.

Figure 2:
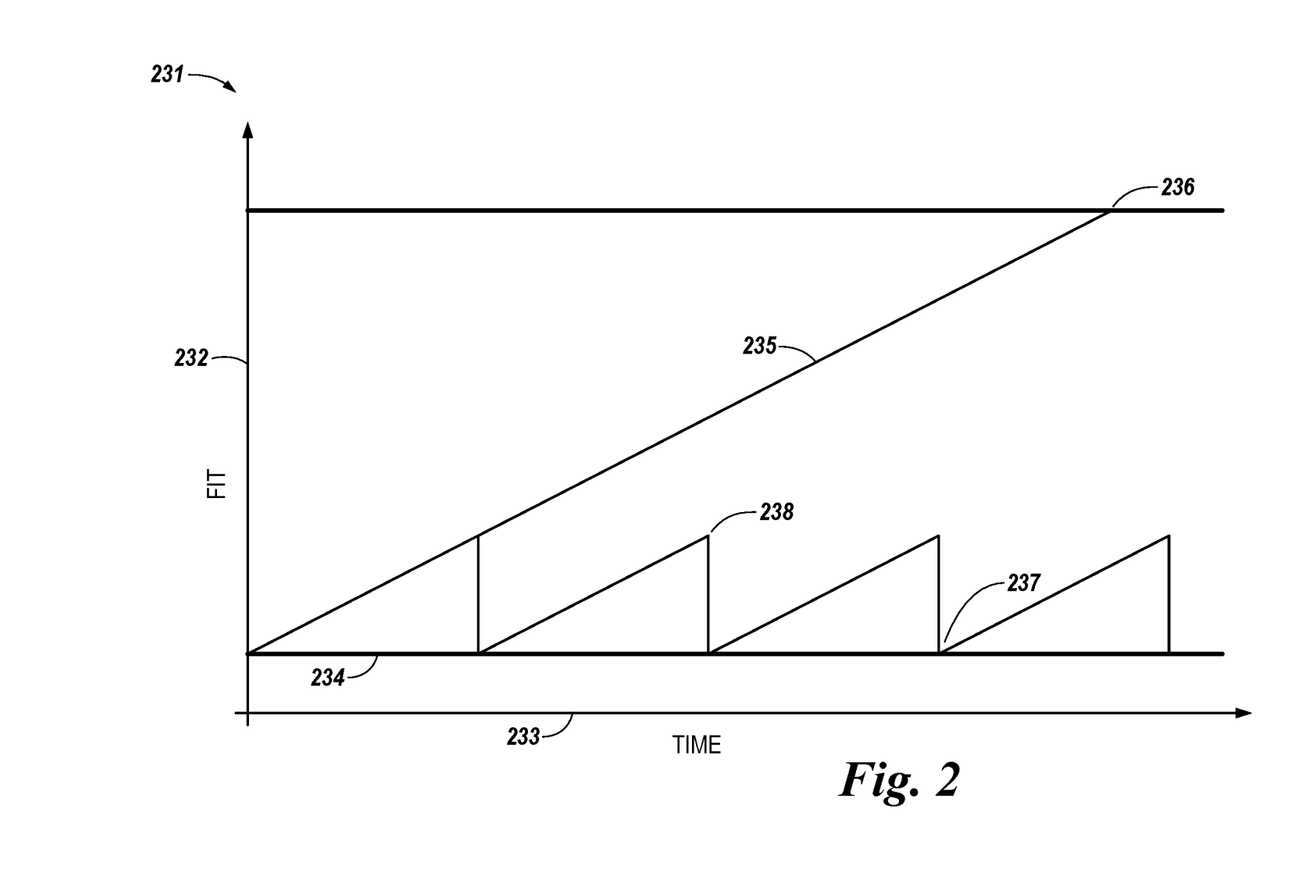
FIG. 2 illustrates an example of a diagram for error correction in accordance with a number of embodiments of the present disclosure.

FIG. 2 illustrates an example of a diagram 231 for error correction in accordance with a number of embodiments of the present disclosure. The example diagram 231 illustrates a failure in time (FIT) rate 232 and a period of time ("TIME") 233 during which the memory system (e.g., memory device 120) is in active and/or standby modes. A first FIT rate 235 indicates an increase in errors in the memory system absent error correction intervention. A threshold FIT rate 236 beyond which errors in the system may become uncorrectable should be avoided in order to insure that future error correction remains possible on data in the system.

A baseline FIT rate 234 indicates a FIT rate at a start time of operation and/or at time zero. A peak 238 of a second FIT rate indicates a threshold FIT rate at which errors of the system are corrected and the FIT rate drops back down to the baseline FIT rate 234 (as illustrated at 237, after correction of a subsequent FIT rate peak). The errors of the system can be corrected by taking the system out of standby mode and performing read and writes in order to activate the error correction system.

The error correction process can include using an ECC component (e.g., ECC 115 in FIG. 1) on a host (such as host 110 in FIG. 1) causing encoding of the data when writing in data into a DRAM subsystem using strong error correction code (ECC) methods and adding ECC information to the data field. An ECC method can include adding redundant data, also referred to as parity data, to data, such that the data can be recovered even when a particular number of errors occur in the data. Each ECC method has a particular error threshold beyond which the ECC method can no longer correct errors. In the process of reading data from the DRAM subsystem, the host (e.g., through a host controller) can perform error detection. In response to detection of errors, the host can initiate error correction methods. The method of ECC correction used by the host can depend on the Raw Bit Error Rate (RBER) of DRAM devices and System Soft Bit Error Rates (SSER). A bit error rate (BER) refers to a number of bit errors per unit time contained in data. The fraction of bits of data that contain incorrect data before applying ECC is referred to as the RBER. An error rate after applying ECC is referred to as an uncorrectable bit error rate (UBER). In some examples, a DRAM system can experience errors rates that error detection and error correction methods are too limited to correct and an UBER above zero will result.

A factor contributing to the BER of a DRAM system is when the DRAM system is in a standby mode for an extended period of time. During this period, the data may experience leakage and/or other error causing phenomena that increase the errors in the DRAM system. When the DRAM system exceeds a threshold that an ECC method is able to correct, the DRAM system can malfunction when it is brought back into operation mode and the data is accessed and operated on. These standby operating modes can be used for communication protocol stacks running in the DRAM subsystem. Examples of these communication protocol stacks can include applications such as V2I, V2C (Vehicle to Infrastructure, Vehicle to Cloud) and additional applications using air interface communication. Air interface can refer to a radio-based communication link between a mobile station and an active base station. As the air interface application is operating in real time, the DRAM system may need to provide the requested data with low latency (e.g., quick response time). In order to achieve this, the DRAM system can be put into a standby mode when not being accessed as shutting off the DRAM system could increase the latency response and thereby render the system ineffective. In this way, the DRAM system can be taken out of standby mode in response to a request from a host to access the data in the DRAM system.

However, remaining in a standby mode for extensive period of times can increase BERs. An ECC component (e.g., an ECC engine such as an internal LPDDR4 ECC engine) may be able to correct some of the errors. These errors may only be corrected when the memory is in read mode (e.g., when error detection and corrections will be applied). When the memory is in standby mode and no read commands are issued, the errors may accumulate and exceed the ECC correctability threshold over time. Further, in that example, when a read command is issued from a host, the memory cells including the errors may provide false information.

In order to avoid the accumulation of these errors while in standby mode, reads can be generated by the host during the standby period even though data is not being requested by the system to perform operations. These reads initiated by the host can be referred to herein as dummy reads as they are not used to perform an operation and are performed in order to decrease errors during the read and write process. In this example, detection and correction methods will be activated by the host generated reads and can keep the BER of the DRAM system within correctability limits (e.g., within limits that maintain an ability to correct the errors in the data). The time period for generation of these dummy reads can depend on a number of factors and on which ECC methods are being performed. For example, a frequency of the dummy reads, error correction, and rewriting back to the memory array can be based on a FIT rate of the data. The FIT rate can be based on an error log maintained by the host controller. Choosing at what time periods during the standby mode and at what time intervals will affect power consumption and data processing efficiency. There will be a tradeoff between power and/or efficiency and a BER level of the DRAM system.

Figure 3:
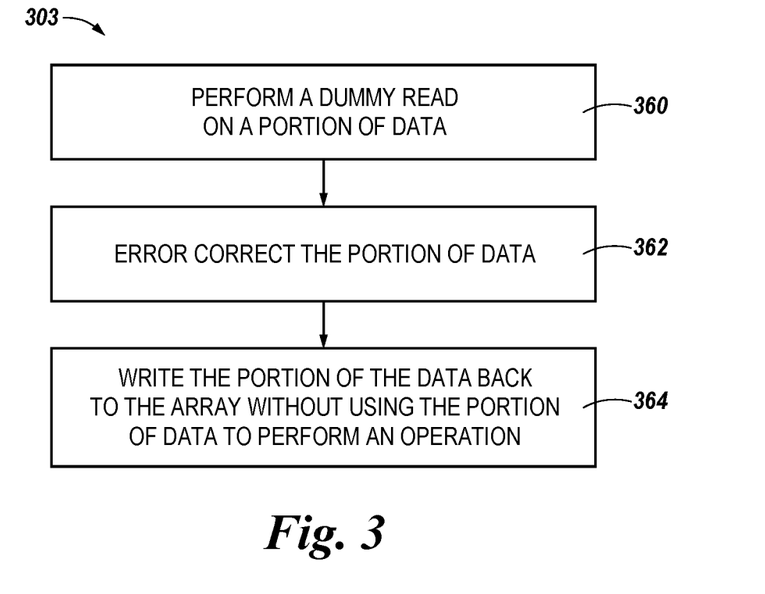
FIG. 3 illustrates an example of a flow chart for error correction in accordance with a number of embodiments of the present disclosure.

FIG. 3 illustrates an example of a flow chart 303 for error correction in accordance with a number of embodiments of the present disclosure. The flow chart 303 is an example of a data restore operation in accordance with the present disclosure. A DRAM system (e.g., such as is included in the memory device 120 in FIG. 1) can store portions of data in a memory array (e.g., memory array 130 in FIG. 1). The DRAM system can be in a standby mode when the portions of data are not being accessed. At 360 of the flow chart 303, a dummy read can be performed on a portion of data in the memory array. A dummy read can refer to a read initiated by a host controller (e.g., controller 141) that is not initiated in order to perform an operation and/or not initiated to carry out a process of the system. The dummy read can be performed solely to detect and correct an error.

At 362 of flow chart 303, the host controller initiating the dummy read can detect and/or correct the portion of data being read from the memory array. The portion of data can be analyzed to detect errors in the data as it is read from the memory array. Detected errors can be corrected by performing a number of ECC error correction methods.

At 364 of flow chart 303, the host controller can cause the portion of data read out of the memory array to be written back to the memory array. In this way, the portion of data read out of the memory array will be corrected and the bit error rate (BER) will be maintained below a threshold correctability level.

Figure 4:
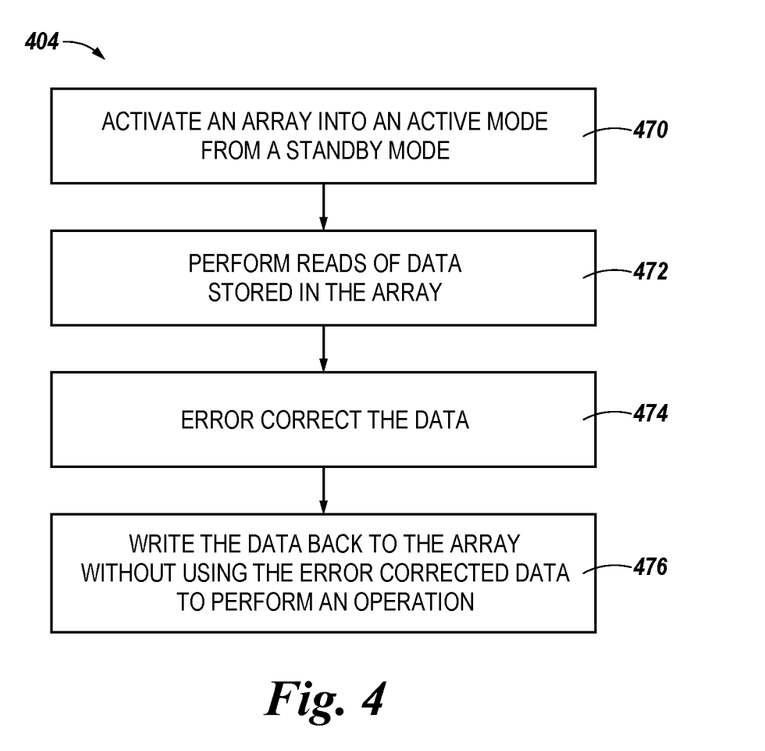
FIG. 4 illustrates an example of a flow chart for error correction in accordance with a number of embodiments of the present disclosure.

FIG. 4 illustrates an example of a flow chart 404 for error correction in accordance with a number of embodiments of the present disclosure. The flow chart 404 is an example of a data restore operation. At 470 of the flowchart 404, a host controller can cause activation of an array of memory cells to an active mode from a standby mode. The array may have previously been in a standby mode due to a period of time without receiving requests for data. While the memory device including the array of memory cells is in the standby mode, refresh operations can be performed without communication between the host and the memory device. As described above, the refresh operation can include refreshing the data in the memory cells without sending the refreshed data on output buffers and without sending the data to a host. Being in standby mode can allow for conservation of energy of the DRAM system while maintain an ability to be accessed at a lower latency than if the DRAM system were shutdown completely (e.g., were in a shut down mode). More energy may be consumed by not shutting down completely but this is balanced with quicker accessibility and/or lower response latency.

At 472 of the flowchart 404, a host controller can cause performance of reads of data stored in an array of memory cells. For example, data can be accessed by the host controller in the array and read out to the host. This can be in response to receiving a request from the host controller to read data out of the array. This can be in response to activating the DRAM system into an active mode out of a standby mode.

At 474 of the flowchart 404, the host controller can cause error correction of the data read out of the array. The data can be analyzed to determine if there are any errors in the data. Detected errors can be corrected by a number of ECC error correction methods performed by the host controller.

At 476 of the flowchart 404, the host controller can cause writing of the data back to the array without using the error corrected data to perform an operation. For example, the data can be read, corrected, and written back to the array in order to correct errors and not used for performing operations and/or providing operational function to the DRAM system.

Figure 5:
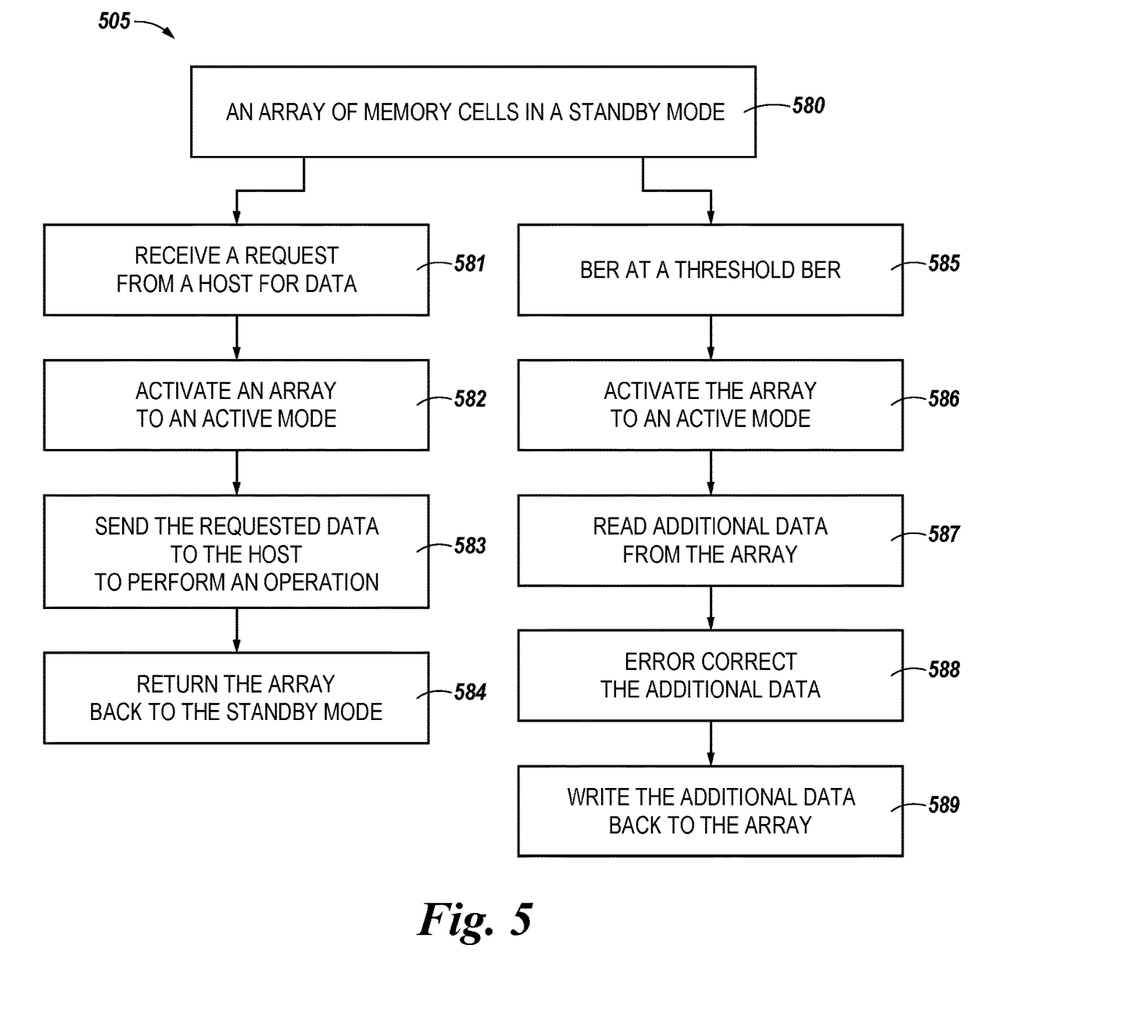
FIG. 5 illustrates an example of a flow chart for error correction in accordance with a number of embodiments of the present disclosure.

FIG. 5 illustrates an example of a flow chart 505 for error correction in accordance with a number of embodiments of the present disclosure. The flow chart 505 is an example of a data restore operation. At 580 of the flowchart 505, a host controller can cause an array of memory cells to be in a standby mode. The array of memory cells can be in standby mode based on a period of time that the array does not receive requests for data and/or requests for access of the array. The array being in standby mode can conserve energy without powering down the array completely. More energy may be consumed by not shutting down completely but this is balanced with quicker accessibility and/or lower response latency.

At 581 of the flowchart 505, the memory array can receive a request from a host controller for data. In response to receiving the request from the host, at 582 of the flowchart 505, the array can be activated from the standby mode to an active mode. Being in the active mode allows the memory array to respond to requests from the host. At 583 of the flow chart 505, in response to receiving the request from the host, and in response to activating the memory array into an active mode, the memory array can send the requested data to the host to perform an operation. At 584 of the flow chart 505, subsequent to the host controller receiving the requested data, the host controller can cause the memory array to return back to the standby mode. The memory array can be in standby mode in anticipation of additional requests from the host.

At 585 of the flow chart 505, a bit error rate (BER) of data of the memory array can be at a threshold. The BER threshold can be previously determined based on an ECC correction method and limitations of correctability associated with the ECC correction method. The BER threshold can be based on requirements of the system and/or particular error threshold requirements of operating the system. At 586 of the flow chart 505, in response to the BER being at the threshold BER, a host controller can cause activation of the array to an active mode. The array can be activated to the active mode from a standby mode. At 587 of the flowchart 505, in response to the BER being at the threshold BER, and in response to the array being in the active mode, additional data can be read from the array to the host. At 588 of the flowchart 505, the additional data read to the host can be error corrected. The additional data can be analyzed to determine which portions of the data contain an error. At 589 of the flowchart 505, the additional data read from the array to the host can be written back to the array. The additional data written back to the array can include the error corrected data and any data of the additional data that did not include an error. In this way, data can be accessed by the host with a low latency response from the array. The array can be in standby mode to preserve energy while operating for long periods of time without lowering latency by completely shutting down. Errors that accumulate while in standby mode can be corrected by reading data out of the array at particular intervals. The read out data can be analyzed for detected errors and the detected errors can be corrected by the host controller performing ECC detection and correction methods. A failure in time (FIT) rate of the DRAM system can be maintained below a threshold FIT. In addition, a bit error rate (BER) of the DRAM system can also be maintained below a threshold BER.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
   an array of memory cells;
   a controller coupled to the array, wherein the controller is configured to:
      activate a portion of data stored in the array out of a standby mode;

perform a dummy read on the portion of data, wherein the dummy read comprises sending the portion of data on output buffers to a host;

error correct the portion of data in the host; and write the error corrected portion of data back to the array.

2. The apparatus of claim 1, wherein the controller configured to perform the dummy read comprises the controller configured to perform a read of the portion of data without using the portion of data for an operation prior to writing the portion of data back to the array.

3. The apparatus of claim 1, wherein the dummy read, error correction, and writing of the error corrected portion of data is performed at a frequency based on a failure in time (FIT) rate of the portion of data.

4. The apparatus of claim 3, wherein the FIT rate is determined based on an error log that comprises a number of errors of the portion of data.

5. The apparatus of claim 1, wherein the controller is configured to perform the dummy read responsive to the apparatus operating in a standby mode for a threshold period of time.

6. The apparatus of claim 5, wherein the array, by operating in the standby mode, is configured to provide data stored in the array to a host with lower latency response than operating in a shut down mode.

7. The apparatus of claim 5, wherein the controller is configured to receive a request to wake the apparatus out of the standby mode.

8. The apparatus of claim 1, wherein the controller configured to error correct the portion of data comprises the controller configured to maintain a bit error rate (BER) of the portion of data below a particular threshold BER.

9. A method, comprising:

activating, in response to receiving a command from a host, a memory array out of a standby mode;

performing a read on a portion of data stored in an array of memory cells, wherein performing the read comprises sending the portion of data through output buffers;

error correcting the portion of data; and writing the portion of data back to the array, wherein the portion of data is written back to the array without the portion of data being used as input data to an operation.

10. The method of claim 9, comprising receiving a request to activate the array prior to performing the read on the portion of data.

11. The method of claim 10, wherein the request is sent after a period of time associated with an accumulation of errors in the portion of data.

12. The method of claim 10, comprising, in response to receiving the request, activating the array to take the array out of a standby mode.

13. The method of claim 9, comprising returning the array back to the standby mode subsequent to writing the portion of data back to the array.

14. The method of claim 13, comprising, subsequent to returning the array back to the standby mode, receiving a request from a host for data from the array.

15. The method of claim 14, comprising sending a response to the request within an amount of time associated with activating the array out of a standby mode.

16. The method of claim 15, wherein the amount of time associated with activating the array corresponds to a lower latency time period.

17. An apparatus, comprising:

an array of memory cells;

a controller coupled to the array, wherein the controller is configured to:

in response to receiving a command from a host, activate the array into an active mode from a standby mode;

perform reads of data stored in the array, wherein the reads comprise sending the read data through output buffers;

error correct the data; and write the data back to the array without using the error corrected data as input data to an operation.

18. The apparatus of claim 17, wherein the controller is configured to:

receive a request from a host to provide a portion of the data from the array; and send the requested portion of the data to the host within a time period threshold.

19. The apparatus of claim 18, wherein the controller is configured to, in response to receiving the request from the host, activate the array into the active mode.

20. The apparatus of claim 19, wherein the controller is configured to, subsequent to sending the request portion, return the array back to the standby mode.

21. A method, comprising:

while a memory device is in a standby mode, initiating a command from a host to the memory device responsive to the device being in the standby mode for a particular amount of time, wherein the memory device activates responsive to the command;

reading data from an array of the memory device by sending the data through output buffers;

transferring the read data from the memory device to the host;

performing an error correction operation on the read data and transferring error corrected data back to the memory device for storage in the array; and returning the memory device to the standby mode responsive to the error corrected data being stored in the array.

22. The method of claim 21, wherein the method includes transferring the error corrected data back to the memory device without using the read data in an execution operation.

23. The method of claim 21, wherein the command comprises a data restore command that results in a data restore operation being performed on one or more banks of memory cells.

24. The method of claim 21, wherein subsequent to returning the memory device to the standby mode, the method includes initiating the command from the host to the memory device responsive to the device being in the standby mode for the particular amount of time.

25. The method of claim 21, wherein the memory device is a DRAM device and wherein transferring the read data from the memory device to the host comprises transferring the data via one of a DDR (double data rate) interface and a LPDDR (low power DDR) interface.

26. The method of claim 21, wherein the method includes adjusting the particular amount of time based on an environmental factor selected from the group comprising:

an altitude of the memory device; and an amount of solar activity.

27. The method of claim 21, comprising:

in response to a bit error rate (BER) of the data stored in the array reaching a threshold BER:

activating the array to an active mode from the standby mode;

reading additional data from the array;
error correcting the additional data; and
writing the additional data back to the array.

28. The method of claim 27, comprising the host sending wake up commands at particular intervals during the standby mode to cause the activation of the memory device.

29. The method of claim 21, wherein reading the data comprises reading data on a bank by bank basis in the array.

30. The method of claim 21, wherein reading the data comprises reading all banks of the memory array.

* * * * *